United States Patent [19]

Zimmer

[11] Patent Number: 5,437,207

[45] Date of Patent: Aug. 1, 1995

[54] MULTIAXIAL MANIPULATOR

[75] Inventor: Ernst Zimmer, Friedberg, Germany

[73] Assignee: Kuka Schweissanlegen & Roboter GmbH, Augsburg, Germany

[21] Appl. No.: 119,211

[22] PCT Filed: Mar. 19, 1992

[86] PCT No.: PCT/EP92/00605

§ 371 Date: Oct. 18, 1993

§ 102(e) Date: Oct. 18, 1993

[87] PCT Pub. No.: WO92/16332

PCT Pub. Date: Oct. 1, 1992

[30] Foreign Application Priority Data

Mar. 21, 1991 [DE] Germany ............. 9103497 U

[51] Int. Cl.⁶ .................. B25J 11/00; B25J 19/00
[52] U.S. Cl. .................. 74/490.02; 414/918; 901/50
[58] Field of Search .......... 74/479 BE, 490.02; 414/918, 744.5; 901/15, 50

[56] References Cited

U.S. PATENT DOCUMENTS

| | | | |
|---|---|---|---|
| 4,855,560 | 8/1989 | Sonoda et al. | 901/42 X |
| 4,917,619 | 4/1990 | Nishiwaki | 901/50 X |
| 4,969,795 | 11/1990 | Toyoda et al. | 901/50 X |
| 5,025,126 | 6/1991 | Hansen | 414/744.2 X |
| 5,115,690 | 5/1992 | Torii et al. | 74/479 BE |

FOREIGN PATENT DOCUMENTS

| | | | |
|---|---|---|---|
| 3237184A1 | 5/1983 | Germany . | |
| 3434899 | 5/1985 | Germany | B25J 19/00 |
| 8703229 | 2/1988 | Germany . | |
| 1565674 | 5/1990 | U.S.S.R. | 414/918 |

OTHER PUBLICATIONS

Japanese Abstract 59-125282, Inutake, Jul. 19, 1984.

Primary Examiner—Allan D. Herrmann
Attorney, Agent, or Firm—McGlew and Tuttle

[57] ABSTRACT

The present invention pertains to a multiaxial manipulator (1), in which the supply lines (9, 10) for the tool (7) and for the manipulator drives (8) are led in separate bundles of lines and are connected separately. The supply lines (9, 10), led in from the outside, are connected to the relatively stationary base (2) of the manipulator (1), wherein at least the supply lines (10) for the tool (7) are then led inside the base (2) to the moving carousel (3). The supply lines (10) again exit to the outside at the carousel (3) and are then led along the moving manipulator parts (4, 5, 6) to the tool (7). The supply lines (9) for the manipulator drives (8) can also be led in a similar manner on the inside through the base (2) and then on the outside, along the manipulator parts (4, 5, 6). It is recommended that the supply lines (9, 10) be divided into a line section (14, 15) led on the outside and an internal line section (12, 13) installed inside the base, wherein the line sections (12, 13, 14, 15) are connected to the carousel (3) via a connection plate (16). The connection plates (11) may be of a modular design for the cable connections and have standardized connection fields (17) for different types of lines.

14 Claims, 2 Drawing Sheets

MULTIAXIAL MANIPULATOR

FIELD OF THE INVENTION

The present invention pertains to a multiaxial manipulator, especially an industrial robot, with supply lines for the tool and the manipulator drives, are led in from the outside and wherein the supply lines are laid along the moving members of the manipulator.

BACKGROUND OF THE INVENTION

Such a manipulator has been known from German Offenlegungs-schrift No. DE-OS 32 37 184. The supply lines for the tool are led there from an external feeding point to the jib and from there to the tool. Rotatable and pivotable holders are provided for the bundle of lines. This routing of lines has the disadvantage that the supply lines are subject to high mechanical loads. Especially the point of transition from the stationary power supply to the moving jib of the manipulator is exposed to danger. This line section must follow multiaxial movements in space and is correspondingly bent in different directions. The fact that the mobility of the manipulator is limited by the line routing is also disadvantageous.

German Offenlegungsschrift No. DE-OS 34 34 899 discloses another manipulator, in which the supply lines for the tool are led from a stationary feeding point to the carousel rotatable around the first principal axis. The supply lines are led from there farther to the tool along the manipulator parts, such as the rocker, jib, and hand. The mechanical loads are already reduced in this routing of the lines. The mobility of the manipulator is, however, still limited. In addition, the line routing is not optimally integrated in the manipulator design in these two cases corresponding to the state of the art.

SUMMARY AND OBJECTS OF THE INVENTION

The object of the present invention is to provide a manipulator with a line routing that is better integrated and permits a higher degree of mobility.

According to the invention, a multiaxial manipulator is provided including a relatively stationary base and a moving carousel connected to the base. Movable manipulator parts are connected to the carousel with a tool connected to the movable manipulator parts. Manipulator drives are provided connected to the manipulator parts for moving the manipulator parts. Supply lines for the tool are provided in a first bundle of lines. The first bundle of lines is connected to the statinary base and extends internally through the base to the moving carousel and extends out of the moving carousel. The first bundle of lines is connected along the manipulator parts to the tool. Supply lines for the manipulator drives are provided separated from the supply lines with the tool, in a second bundle of lines. The second bundle of lines is connected to the base and is connected along the moving manipulator parts.

In the manipulator according to the present invention, the supply line for the tool and the manipulator drives are led in separate bundles of lines and are connected separately, but they extend extensively in parallel to one another. This makes possible a comprehensive integration of the lines in the manipulator design, and yet rapid replacement and retrofitting of the supply lines for the tool. The manipulator may also be delivered without supply lines for the tool. The supply lines may be connected and laid subsequently on request. However, the optional laying of these supply lines is inherently provided for and preparations for laying are made.

The supply lines are divided into a plurality of line sections, wherein they are subject to defined loads in each line section, and they must follow rotations around an individual axis, if need be. Due to the line connection at the base, which is relatively stationary in relation to the feeding point, a stationary supply line, which is subject to low loads, is obtained. The supply lines are laid in this case on the manipulator in an internal line section, which is done preferably in the form of a flexible loop, which is able to follow the intended rotary movements of the carousel around the first, mostly vertical principal axis, without any problem. Due to the internal laying, this line section is shorter and more mobile than an external supply line leading to the carousel, as a result of which obstacles for the manipulator, as well as the line loads are reduced.

At least the supply lines for the tool are again led out of the interior space of the manipulator at the carousel, and are then led to the tool externally, along the manipulator parts, e.g., the rocker, jib, and hand. This is favorable regarding the load in view of the principal or pivot axes of the manipulator, which extend mostly horizontally. Also, the supply lines are now again freely accessible from the outside.

The present invention has the further advantage that the supply lines can be standardized. The line sections can be tested and optimized individually. A modular line design, which is suitable for all applications of the manipulator and for all tools, is obtained.

According to the state of the art, the line leading to the tool had to be checked and tested for loads and reliability of operation after each replacement of the tool and line. This entailed considerable expense, which recurred with each tool. This is no longer necessary with the modular line design.

The interfaces of the individual line sections are also standardized in the form of modularly designed connection plates with prepared and defined connection fields. On the one hand, the connection plates offer the advantage of fixed connection points of the line ends. On the other hand, the different supply lines of the tool for electrical, hydraulic, or pneumatic energy supply, test and control signals, cooling agents, etc., are equipped with special couplings, which are designed as inserts for the connection plates. The size and shape of the different coupling inserts are adapted to the connection fields, and they can thus be replaced easily, rapidly, and with accurate fit in the case of replacement of tools and lines. Connection fields that are not needed can be covered with a plug.

The possibility of selectively replacing or retrofitting individual line sections is also advantageous. Selective replacement is favorable for repair and maintenance purposes. The possibility of retrofitting permits additions to or conversion of the tool.

The supply lines may be especially adapted to an individual tool and are replaced together with the individual tool. However, it is also possible to arrange an interchangeable coupling for different tools on the hand of the manipulator and to design the supply lines as trunk lines for all necessary operating materials. Only the needed lines are now opened for the tools by suitable line couplings, while the others remain closed.

There are further possibilities of variation for the line designs as well.

BRIEF DESCRIPTION OF THE DRAWINGS

The present invention is schematically represented as an example in the drawings. Specifically.

DETAILED DESCRIPTION OF THE PREFERRED EMBODIMENT

Figure 1:
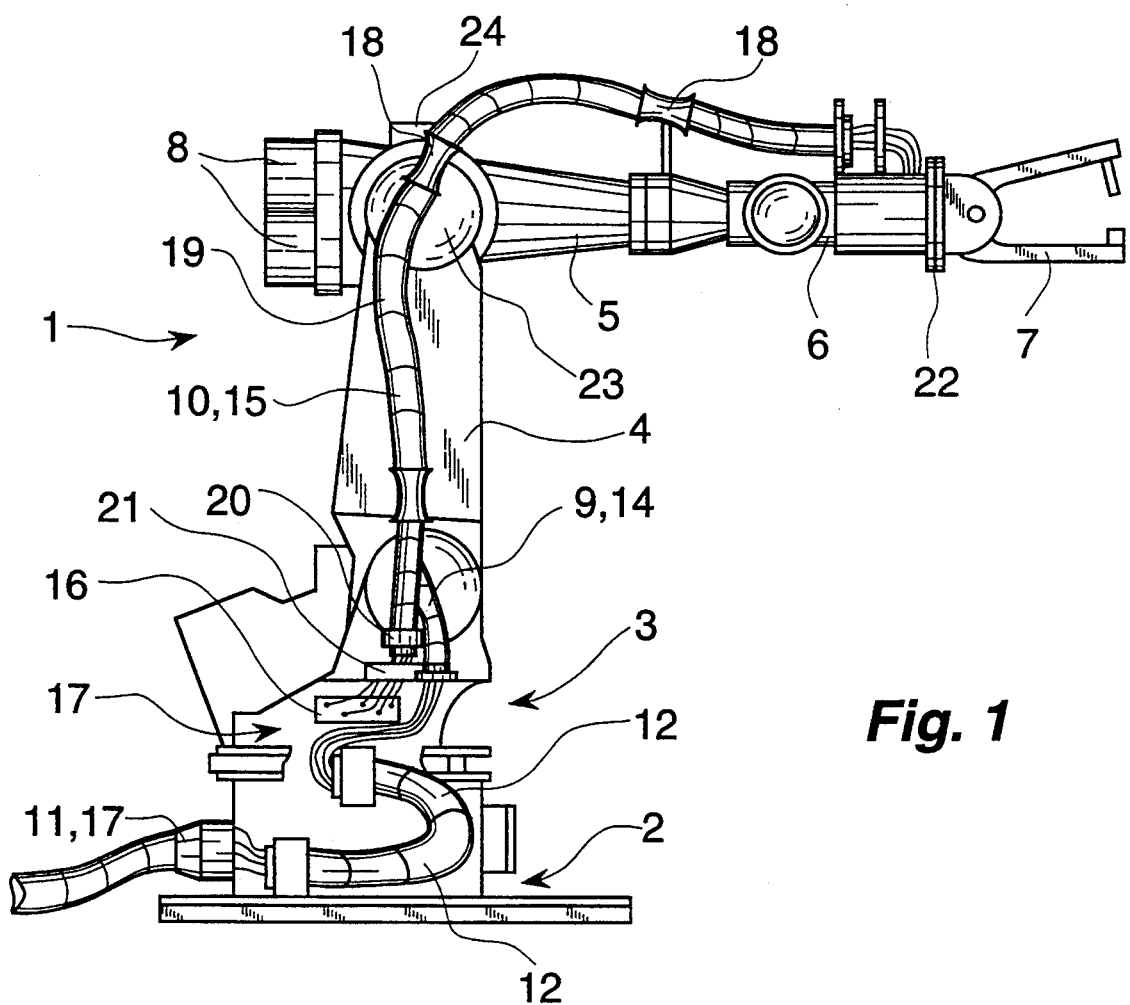
FIG. 1 shows a side view of a multiaxial manipulator with supply lines for the tool.
Figure 2:
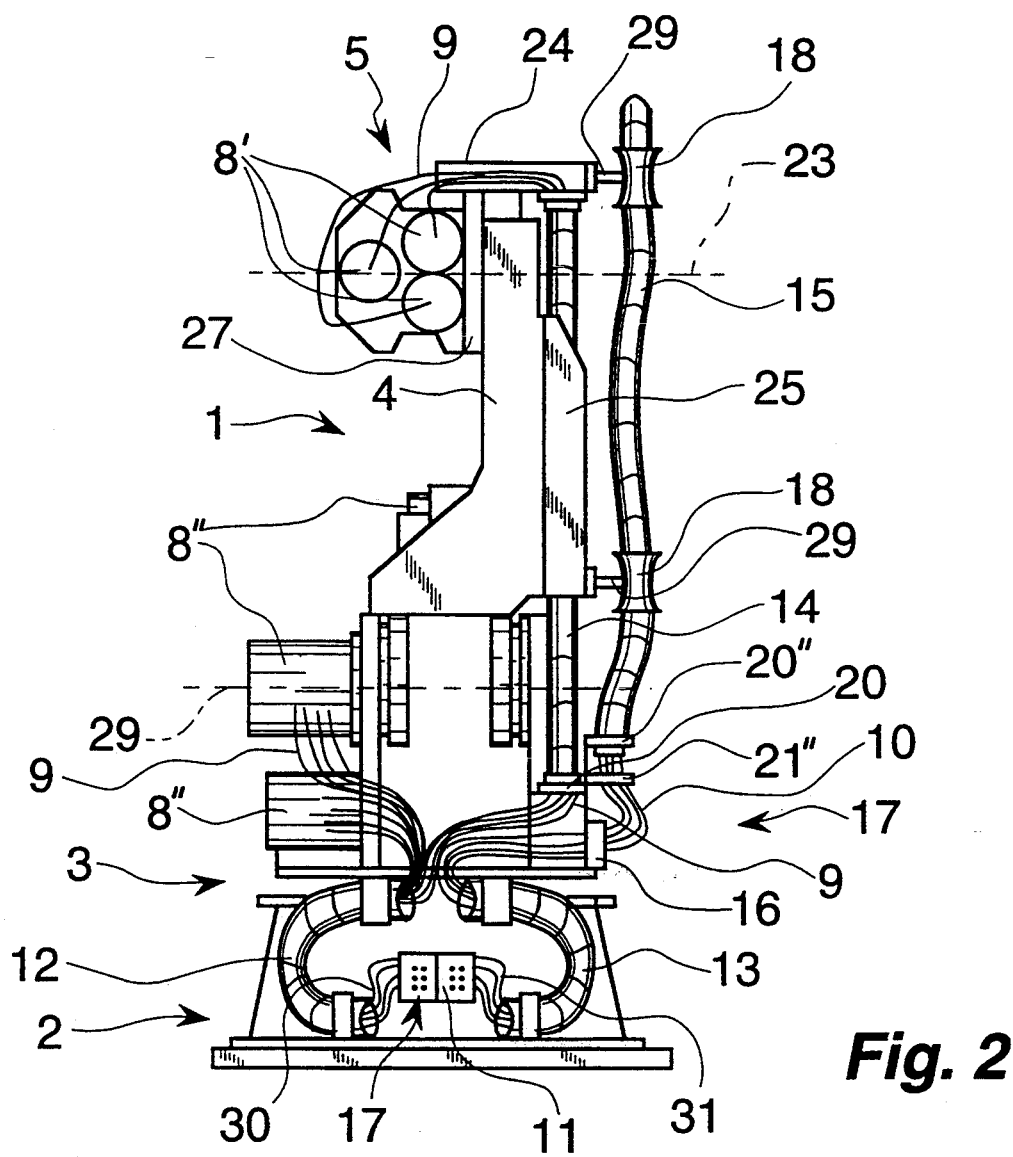
FIG. 2 shows a front view of the manipulator corresponding to arrow II in FIG. 1.

The drawings show a multiaxial manipulator 1 in the form of an industrial robot, which has a base 2 with a carousel 3 rotatable on it around a vertical axis. A rocker 4 is mounted on the carousel 3 rotatably around a horizontal pivot axis 29. The rocker 4 is designed as a one-armed rocker and is arranged symmetrically to the central axis or the axis of rotation of the carousel. A jib 5, which is able to rotate around a pivot axis 23, which is likewise horizontal, is mounted on one side at the top end of the rocker 4 via a drag barring 27. The jib 5 carries at its end a multiaxial hand 6 of the manipulator. A tool 7, here in the form of spot-welding tongs, is attached to the hand. Drives 8 are provided for moving the individual parts of the manipulator. The three drives 8' needed for a central hand 6 are arranged at the end of the jib 5 in a compactly packed triangular arrangement.

A plurality of drive supply lines 9 are provided for the drives 8 of the manipulator 1. These are power cables for the electrical energy supply for the motors, and power cables for test and control signals, etc. As a result, displacement transducers and shaft encoders load sensors, and similar other parts of the manipulators are supplied as well. Lubricants or cooling agents can also be transported to individual assembly units of the manipulator 1.

Tool supply lines 10 separate from the above are provided as well. Depending on the type and the design of the tool, these may be power cables, compressed air hoses, cooling agent lines, hydraulic hoses, and similar other lines for operating and auxiliary materials needed by the tool 7.

The supply lines 9, 10 are led separately from one another and are integrated in first and second bundles of lines 30, 31 respectively. They are led from a feeding point (not shown) to the base 2 of the manipulator 1, and are connected next to each other to a connection plate 11 in the base wall there. The base 2 is relatively stationary in relation to the feeding point, so that a stationary supply line is obtained in that area. The base 2 is preferably attached to the floor or a wall, but it may also be arranged on a slide, a portal, or the like.

Over their further course in and along the manipulator 1, the supply lines 9, 10 are divided into sections, namely, an internal line section 12, 13, which is laid inside the base 2 to the rotatable carousel 3, which again exits there, and continues in adjoining external line sections 14, 15. The external line section 15 is led along the rocker 4, the jib 5, and the hand 6 to the tool 7, while the external line section 14, which is led essentially in parallel thereto, is led along the rocker 4 to the drives 8' at the end of the jib 5.

The internal line section 12 for the manipulator drives 8 or other parts or assembly units of the manipulator and the internal line sections 13 for the tool 7 are laid in the base 2 in a U-shaped loop each. The two loops are located opposite each other around the axis of rotation of the carousel 3, and roll against the base 2 during a relative rotary movement of the carousel 3.

The internal line section 13 leading to the tool 7 ends at the carousel 3 in another connection plate 16 and it again exits here. The external line section 15 is also connected to the connection plate 16.

The internal line section 12 provided for supplying the manipulator can be divided into a plurality of individual strands in the base 2 and at the transition in the carousel 3. Part the individual strands are 8" located at the bottom for the rocker 4 for the carousel 3, as well as to additional users, if there are any. The other part exits the interior space of the carousel 3 to the outside at, or next, to the another connection plate 16. The external line section 14 is led along the rear side of the rocker 4 facing away from the hand drives 8' and is surrounded by a housing 25 in at least some sections. At the top end of the rocker, the supply lines 9 pass over the drag bearing 27 by means of a bridge 24 to the jib 5 and to the drives 8'. The bridge 24 is connected to the jib 5 and rotates with same around the pivot axis 23. As a result, the external line section 14 follows the movements of the jib.

The supply lines 9 for the drives 8 and for other parts and assembly units of the manipulator 1 are necessary for operation and are always present. The supply lines 10 for the tool 7 are, in contrast, optional and depend on the type and the design of the tool 7. They are adapted to the requirements of the tool, which may lead to great differences in the types and numbers of the individual lines and consequently in the cost as well. The line routing is therefore designed to be such that the supply lines 10 leading to the tool 7 can also be arranged and retrofitted on a finished and inexpensive standard or mass-produced manipulator without comprehensive disassembly and assembly operations.

The connection plates 11, 16 are designed as modular connection plates for this purpose, and they have standardized connection fields 17. The connection plates 11, 16 may be divided into different connection fields 17. The manipulator's own supply lines 9 are preferably separated into the external line section 14 and are led via a separate connection at the carousel 3. As an alternative, it is also possible, however, to provide connection possibilities for this at the connection plate 16.

The connection plates 11, 16 form the interfaces for the stationary supply line, and the internal and external line sections 12, 13, 15. The connection plates 11, 16 are mounted in the wall of the base 2 or on the carousel 3, and they offer stationary connection points for the line sections. The line ends are equipped for this purpose with couplings, which are adapted to the actual type of line. The couplings are designed as inserts, which have identical shape and are accommodated in the standardized connection fields 17. The coupling inserts of the different lines thus can be interchanged and replaced without problems. The connection fields 17 have prepared sockets with fastening means for the coupling inserts. There are as many sockets in the connection fields 17 as needed for maximum supply of the tool as well as for a maximum type and number of supply lines 10. Unneeded sockets are not occupied, and they are covered with a plug. It is also possible to provide reserve connection fields 17 or reserve sockets for the possible future expansion of tools.

Figure 3:
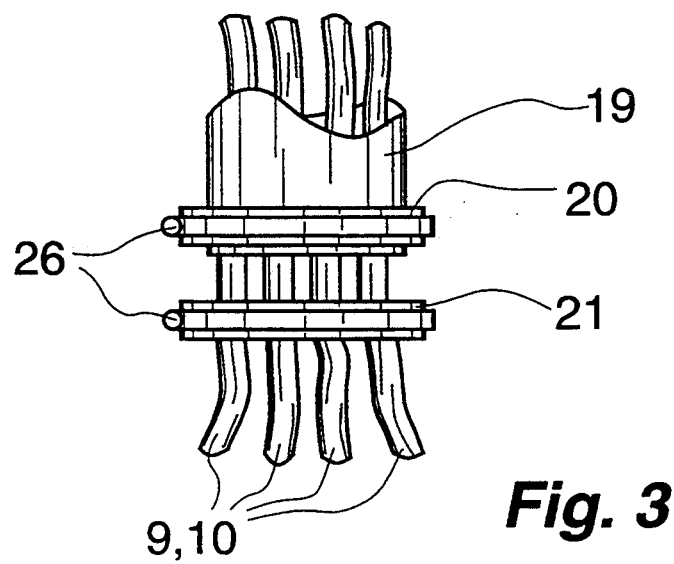
FIG. 3 shows a detail view of a clamping device for supply lines and an insulating tube.

The supply lines 9, 10 are each led bundled in the area of the loops within the base 2 and in the external line sections 14, 15, and are surrounded by an insulating tube 19. The insulating tubes 19 are fastened in the base 2 via holders at the bottom plate of the base 2 at one end and at the bottom plate of the carousel 3 at the other end. The lines are thus held together in the bundle and guided during the rotary movements of the carousel 3. The carousel bearing is designed as a ring of relatively large diameter, through the interior space of which the supply lines 9, 10 pass over into the housing of the carousel 3. They are preferably routed as open bundles here. The supply lines 10 leading to the tool 7 are held at the ends of the external section 15 by a clamping device 20, 21. As is illustrated in FIG. 3, one clamp 20 holds the insulating tube 19, while the clamp 21, which is arranged in front of it at a slightly spaced location, holds the supply lines 10. It is provided for this purpose with a separating insert, as is known, for example, from DE-OS 34 34 899. The individual line strands are clipped into prepared openings of the disk-shaped insert, and the insert is then guided in the clamp 21 in a positive-locking manner. Both clamps 20, 21 have quick-acting closures 26.

The clamps 20', 21' are attached to the tool 7 separately from one another at the top end. This ensures strain relief for the supply lines 10 in relation to the insulating tube 19. At the lower end, the clamps 20'', 21'' are attached to a flange, which extends upward in one piece from the connection plate 16. The supply lines exposed after the clamps 20, 21 are then led in a soft bend to their coupling inserts in the connection plate 16.

In the external line section 15, the supply lines 10 and the insulating tube 19 surrounding same is held and led in a plurality of line holders 18. The line holders 18 have a housing, which is expanded on both sides in the form of a trumpet and is mounted rotatably and/or pivotably to pivot shafts 29. Two line holders 18 are arranged at the rocker 4 in the area of the pivot axes 23, but at a laterally paced location therefrom. The jib 5 carries an additional line holder 18 via a spring-loaded arm 28. The line holders have a housing that can be opened by hinges with quick-acting closure.

The supply lines 10 can be adapted to a special individual tool 7, e.g., a welding torch, welding tongs, a spray gun, a mounting head, or other similar designs. In this case, they contain only the types of lines that are necessary for them. The supply lines 10 are also replaced for replacing the tool.

FIG.1 shows an alternative hereto. The manipulator 1 carries on the hand 6 an interchangeable coupling 22, which makes it possible to use and replace different types of individual tools 7. Various designs of such interchangeable couplings 22 have been known. The different individual tools 7 need different supplies. The supply lines 10 are designed as a trunk line with collection coupling inserts for the different types of tools, and they provide all the needed supplies. The supply lines 10 end at the interchangeable coupling 22. The clamps 20', 21', are arranged on the shaft of the interchangeable coupling 22 in this case. The line ends are provided with closures, which are opened by the individual tool 7 attached when needed, but otherwise they remain closed.

PARTS LIST

1 Manipulator, industrial robot

-continued

PARTS LIST

2 Base, frame
3 Carousel
4 Rocker
5 Jib
6 Hand
7 Tool
8 Drive
9 Supply lines, robot
10 Supply lines, tool
11 Connection plate (tool, robot)
12 Internal line section, robot
13 Internal line section, tool
14 External line section, robot
15 External line section, tool
16 Connection plate, tool
17 Connection field
18 Line holder
19 Insulating tube
20 Clamp, insulating tube
21 Clamp, supply lines
22 Interchangeable coupling, tool
23 Pivot axis
24 Bridge
25 Housing
26 Quick-acting closure
27 Drag bearing
28 Spring loaded arm
29 Pivot shafts
30 First bundle of lines
31 Second bundle of lines

I claim:
1. Multiaxial manipulator, comprising:
a relatively stationary base;
a moving carousel connected to said base;
movable manipulator parts connected to said carousel;
a tool connected to said movable manipulator parts;
manipulator drives connected to said movable manipulator parts for moving said manipulator parts;
supply lines for said tool provided in a first bundle of lines, said first bundle of lines being connected to said stationary base and extending internally through said base and said moving carousel, said supply lines of said tool extending out of said moving carousel and being connected along said manipulator parts to said tool; and
supply lines for said manipulator drives provided separate from said supply lines for said tool, in a second bundle of lines, said second bundle of lines being connected to said base and being connected along said moving manipulator parts.

2. Manipulator according to claim 1 wherein said supply lines for said tool are divided into two line sections including an internal line section and an external line section, said internal line section passing through said stationary base and said moving carousel, said internal line section ending at a carousel connection plate at said carousel, said external line section being connected at said carousel connection plate.

3. Manipulator according with either claim 1 or 2, wherein said supply lines for said manipulator drives are routed in an internal line section through said base and said carousel and extend outside said carousel in a branch, one part of said branch continuing as an external line section essentially in parallel to said supply lines for said tool, extending to upper manipulator drives, wherein said internal line sections include flexible loop means for coiling and uncoiling inside the said base.

4. Manipulator in accordance with either claim 1 or 2, wherein said internal line sections are laid as flexible loop.

5. Manipulator in accordance with claim 2, wherein a base connection plate is arranged at said base for connection of said supply lines, said base connection plate and said carousel connection plate being of a modular design having standardized connection fields for different types of lines.

6. Manipulator according to claim 5, wherein said connection fields include interchangeable coupling inserts, adapted to different types of lines.

7. Manipulator according to claim 2, wherein said external line section is led in line holders, said line holders being arranged rotatably at a spaced location from pivot axes of said manipulator parts.

8. Manipulator according to claim 2 further comprising:
   an insulating tube with at least said external line section of said supply lines being arranged in said insulating tube; and
   clamps connected to one of end side connection points of said insulating tube with separate clamping points for said insulating tube and said supply lines.

9. Manipulator according to claim 8, wherein said clamps include quick-acting closures and include a guide insert for individual strands of supply lines.

10. Manipulator according to claim 6, wherein said supply lines for said tool and said coupling inserts are specially adapted to said tool.

11. Manipulator according to claim 6, wherein said manipulator parts are attached to an interchangeable coupling for coupling said tool to said manipulator parts and for replacing said tool with another similar tool, said supply lines for said tool and said coupling inserts being designed as trunk lines or collection inserts for different tools.

12. Manipulator according to claim 2, wherein said manipulator parts include a rocker and a jib and a bridge connected to the jib, said external line sections being led along said rocker on a side of said rocker facing away from said jib and said supply lines for said manipulator drives being led over a drag bearing in said bridge.

13. Manipulator according to claim 1, further comprising a protective housing connected to one or more of said manipulator parts, said supply lines being surrounded at least partially by said protective housing.

14. Multiaxial manipulator, comprising:
   a base;
   a carousel rotatably connected to said base;
   a plurality of movable manipulator parts sequentially extending from said carousel;
   a tool connected to one end of said movable manipulator parts;
   a plurality of manipulator drive means connected to said plurality movable manipulator parts and for moving said plurality of manipulator parts;
   a plurality of tool supply lines are provided in a first bundle, said first bundle being connected to said base and extending internally through said base and said moving carousel, said first bundle then extending out of said moving carousel and being affix along said manipulator parts and connecting to said tool;
   drive supply lines being connected to said base and extending along said manipulator parts to said plurality of manipulator drive means, said drive supply lines are provided in a second bundle separate from said first bundle of said tool supply lines.

* * * * *